US006938880B2

(12) United States Patent
Enke et al.

(10) Patent No.: US 6,938,880 B2
(45) **Date of Patent: *Sep. 6, 2005**

(54) INJECTION VALVE COMPRISING AN OPTIMIZED SURFACE GEOMETRY BETWEEN A NOZZLE BODY AND A RETAINING NUT

(75) Inventors: Olaf Enke, Munich (DE); Günter Lewentz, Regensburg (DE); Alwin Perras, Breitenbrunn (DE); Andreas Voigt, Regensburg (DE); Hakan Yalcin, Neu-Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/854,832

(22) Filed: May 27, 2004

(65) Prior Publication Data

US 2004/0217321 A1 Nov. 4, 2004

Related U.S. Application Data

(63) Continuation of application No. 10/271,240, filed on Oct. 14, 2002, now Pat. No. 6,799,748, which is a continuation of application No. PCT/DE01/01430, filed on Apr. 11, 2001.

(30) Foreign Application Priority Data

Apr. 14, 2000 (DE) ........................................ 100 18 663

(51) Int. Cl.[7] ................................................ F16K 51/00

(52) U.S. Cl. ............... 251/362; 251/129.15; 239/533.6; 239/585.1

(58) Field of Search ................................. 251/360, 362, 251/366, 367; 239/533.1, 533.2, 533.3, 533.4, 533.5, 533.6, 533.7, 533.8, 533.9, 533.11, 533.12, 585.1, 585.2, 585.3, 585.4, 585.6, 900

(56) References Cited

U.S. PATENT DOCUMENTS

| | | | |
|---|---|---|---|
| 4,314,670 | A | 2/1982 | Walsh, Jr. |
| 6,053,432 | A | 4/2000 | Stevens |

FOREIGN PATENT DOCUMENTS

| | | | | |
|---|---|---|---|---|
| DE | 2926382 | A1 | 1/1980 | F02M/61/16 |
| DE | 19508636 | A1 | 9/1996 | F02M/61/08 |
| DE | 19523243 | A1 | 1/1997 | F02M/61/16 |
| DE | 19523243 | | 1/1997 | F02M/61/16 |
| DE | 19729843 | A1 | 1/1999 | F02M/61/16 |
| EP | 0890734 | A2 | 5/1998 | F02M/61/16 |

*Primary Examiner*—Edward K. Look
*Assistant Examiner*—John K. Fristoe, Jr.
(74) *Attorney, Agent, or Firm*—Baker Botts L.L.P.

(57) ABSTRACT

The injection valve has a housing, a nozzle body and a clamping nut connected to the housing that contacts the nozzle body with first contact surface (9) acting on a second contact surface (10), whereby the clamping nut clamps the nozzle body against the housing. The first or second contact surface has a curvature (24) towards the second or first contact surface and the both contact surfaces are in contact in the area of the curvature.

11 Claims, 2 Drawing Sheets

INJECTION VALVE COMPRISING AN OPTIMIZED SURFACE GEOMETRY BETWEEN A NOZZLE BODY AND A RETAINING NUT

CROSS REFERENCE TO RELATED APPLICATION

This application is a continuation of U.S. patent application Ser. No. 10/271,240 filed Oct. 14, 2002, now U.S. Pat. No. 6,799,748, which is a continuation of co-pending International Application No. PCT/DE01/01430 filed Apr. 11, 2001, which designates the United States, and claims priority to German application number DE 10018663.7 filed Apr. 14, 2000.

BACKGROUND OF THE INVENTION

The invention relates to an injection valve. Injection valves conventionally have a valve housing in which, for example, an actuator for controlling a servo valve is provided. The servo valve sets a pressure in a control chamber. Furthermore, the injection valve has a nozzle body which has a sealing seat and injection holes. A recess in which a nozzle needle is guided is made in the nozzle body. The nozzle needle is moved as a function of the pressure in the control chamber.

The recess has a pressure chamber which is connected to a fuel line of the housing. Since a fuel is guided at high pressure in the fuel line, particularly in the case of diesel injection valves, a sealing point is produced between the housing and the nozzle body. The sealing point is preferably sealed by the nozzle body being pressed against the housing. A clamping nut is provided for this purpose, said nut being connected to a thread of the housing and prestressing the nozzle body against the housing. The prestressing of the nozzle body requires large prestressing forces particularly at a high fuel pressure. The prestressing force has to be transmitted by the clamping nut to the nozzle body via an optimized geometry. For this purpose, it is known to form a bearing surface on the nozzle body, which surface is of conical design and tapers in the direction of the tip of the nozzle body.

At the same time, the clamping nut has a conical bearing surface which tapers in the direction of the tip of the nozzle body. A defined differential angle is made between the bearing surface of the nozzle body and the bearing surface of the clamping nut in order to ensure a defined surface pressure. At a very large prestressing force it has been shown that the action of force perpendicular with respect to the longitudinal direction of the nozzle body is relatively large and therefore produces an expansion of the clamping nut in the radial direction. Damage to the clamping nut may occur as a consequence.

SUMMARY OF THE INVENTION

The object of the invention is to provide an injection valve in which an optimized transmission of the prestressing force to the nozzle body is achieved.

The injection valve according to an embodiment of the invention has an optimized transmission of force between the clamping nut and the nozzle body. The optimized transmission of force is achieved by the surface with which the clamping nut rests on the nozzle body being enlarged. The enlarged surface is achieved by a curved shape which is formed either on the clamping nut or on the nozzle body. Owing to the curved shape, instead of a linear contact between the nozzle body and the clamping nut contact in the form of a ring surface is ensured.

The injection valve according to an embodiment has the advantage that the force for prestressing the nozzle body is transmitted via a transmission element. The transmission element permits a lower loading of the clamping nut in the radial direction.

The bearing surface which rests on the curved bearing surface preferably has a conical surface. The conical surface is preferably arranged at an angle of 40° and 60° with respect to the central axis of the injection valve. The pairing of the curved bearing surface with the planar conical surface provides a cost-effective embodiment.

In a preferred embodiment, the clamping nut has a concave partially spherical surface and the nozzle body has a convex surface. By means of this embodiment, an improved surface contact between the clamping nut and the nozzle body is achieved.

The curved bearing surface preferably has a convex surface. The radius of the convex surface lies preferably in the range from 20 to 60 mm.

In order to support the pressure chamber of the nozzle body, the curved surface is preferably arranged at the height of the pressure chamber, so that the line of action of the prestressing force passes through the pressure chamber. In this manner, at the same time as the nozzle body is pressed against the housing, the pressure chamber is supported from the outside, so that a high compressive strength of the nozzle body is achieved.

An optimum support in terms of pressure of the pressure chamber is achieved by the curved bearing surface being arranged at the height of the center of the pressure chamber.

The clamping nut preferably has a ring part which merges into a sleeve part. The sleeve part is arranged perpendicular with respect to the longitudinal axis of the injection valve. A first bearing surface is arranged on the ring part. In addition, a transmission element is provided which transmits the radial component of the prestressing force of the nozzle body into a virtually axial component which engages on the ring part. The transmission of the radial prestressing force to the ring part of the clamping nut makes it possible to make the sleeve part relatively thin. An overall small diameter of the injection valve is made possible by means of a thin sleeve part.

The transmission element preferably has in cross section the shape of a wedge with a third and fourth bearing surface, the third and fourth bearing surfaces being aligned at an angle of less than 90° with respect to each other.

The transmission element is preferably designed in the form of a ring which enables the prestressing force to be transmitted in a manner distributed uniformly around the circumference of the nozzle body.

The transmission element preferably bears against the ring part of the clamping nut, the surface pairing being arranged at an angle of approximately 90° with respect to the central axis of the injection valve. At the same time, a second surface pairing, which is arranged between the transmission element and the nozzle body, has an angle of 20° to 40° with respect to the central axis of the injection valve.

The abovementioned geometries ensure an improved transmission of the prestressing force.

BRIEF DESCRIPTION OF THE DRAWINGS

The invention will be explained in greater detail below with reference to the figures, in which.

DETAILED DESCRIPTION OF THE PREFERRED EMBODIMENT

Figure 1:
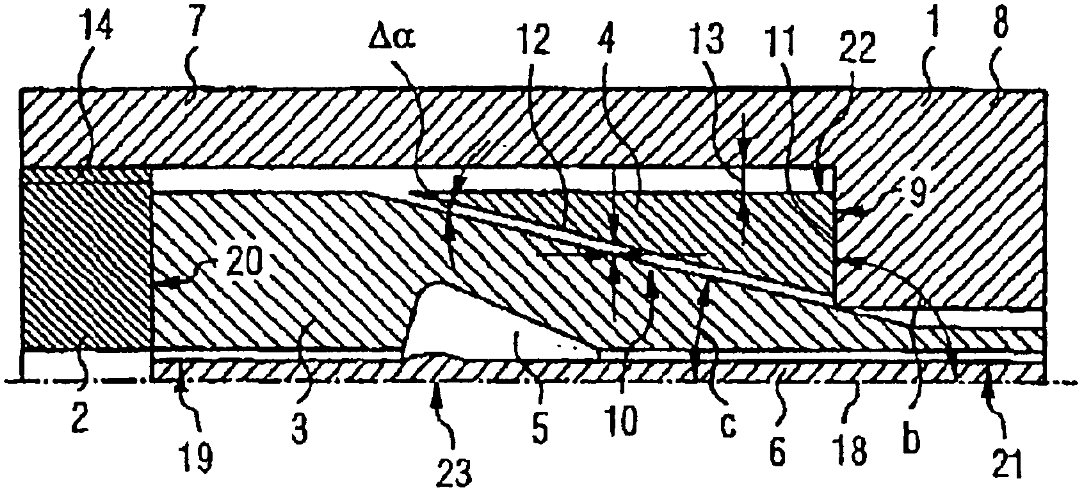
FIG. 1 shows a first embodiment with a transmission element.

FIG. 1 shows a partial cross section through an injection valve, in which part of a housing 2, part of a nozzle body 3, part of a clamping nut 1 and the cross section through a transmission element 4 is illustrated. The cross section is arranged perpendicular with respect to a central axis of symmetry 18 of the injection valve. All of the parts illustrated in the figures are designed rotationally symmetrically with respect to the central axis of symmetry 18.

The nozzle body 3 has a first section 19 which is of cylindrical design and bears with a pressure surface 20 against the housing 2. The first section 19 merges via a second bearing surface 10 into a second section 21 which is likewise of cylindrical design. The second section 20 has a smaller diameter than the first section 19.

The nozzle body 3 has a recess 23 which is arranged symmetrically with respect to the central axis 18 and has a widened area which constitutes a pressure chamber 5. The recess 23 serves as a fuel accumulator. A nozzle needle which is assigned at its tip to a sealing seat in the nozzle body is placed in the recess 23. The nozzle needle 6 is guided in the region of the first section 19 in the recess 23. Furthermore, injection holes which are in connection with the pressure chamber 5 and are arranged below the sealing seat are made in the nozzle body 3. If the nozzle needle 6 bears against the sealing seat, then there is no connection between the pressure chamber 5 and the injection holes. If the nozzle needle is lifted off the sealing seat, then the fuel which is present in the pressure chamber 5 can pass laterally past the nozzle needle 6 to the injection holes, and an injection takes place.

The second bearing surface 10 is designed as a conical surface which tapers from the first section 19 in the direction of the second section 21. The second bearing surface 10 is preferably at a third angle c with respect to the central axis of symmetry 18. The third angle c lies in the range of from 10° to 70°, preferably between 40° and 60°.

The nozzle body 3 is encircled by a clamping nut 1 which has a ring part 8 which merges into a sleeve part 7. The ring part 8 is arranged in the region of the second section 21. The sleeve part 7 is guided as far as the housing 2 along the second bearing surface 10 and the first section 19. The sleeve part 7 is screwed to the housing 2 via a thread 14. The ring part 8 has a first bearing surface 9 which is arranged at a second angle b with respect to the central axis of symmetry 18. The second angle b preferably lies in the region of 90°. The first bearing surface 9 faces the second bearing surface 10. The transmission element 4, which is preferably designed in the form of a ring, is arranged between the clamping nut 1 and the nozzle body 3. The cross section of the transmission element 4 essentially has a triangular shape, a third bearing surface 11 of the transmission element 4 being assigned to the first bearing surface 9, and a fourth bearing surface 12 of the transmission element 4 being assigned to the second bearing surface 10. The transmission element 4 has an outer surface 22 which essentially constitutes a cylindrical surface which is arranged essentially parallel to the inner surface of the sleeve part 7. A defined gap 13 is provided between the outer surface 22 of the transmission element 4 and the inner surface of the sleeve part 7.

The first and the third bearing surface 9, 11 and the second and the fourth bearing surface 10, 12 constitute a first and a second surface pairing, respectively. The first bearing surface 9 is preferably arranged virtually parallel to the third bearing surface 11, and the second bearing surface 10 is preferably arranged virtually parallel to the fourth bearing surface 12. A differential angle a is usually provided between the first and third bearing surfaces 9, 11 and the second and fourth bearing surfaces 10, 12.

The transmission element 4 has, in the form of a ring, a partially wedge-shaped inner recess which corresponds essentially to the conical shape of the second bearing surface 10. The radius of the inner recess of the transmission element 4 is matched to the conical shape of the second bearing surface 10 in such a manner that the entire fourth bearing surface 12 of the transmission element 4 rests on the second bearing surface 10 of the nozzle body 3.

The clamping nut 1 is screwed to the housing 2 via the thread 14, so that the transmission element 4 is pressed by the first bearing surface 9 in the direction of the first section 19. In the process, the fourth bearing surface 12 of the transmission element 4 comes into contact with the second bearing surface 10 of the nozzle body 3, a transmission of force between the ring part 8 and the second bearing surface 10 taking place. By means of the defined gap 13 it is ensured that radial forces are not transmitted to the sleeve part 7 of the clamping nut 1. This permits a relatively narrow design of the sleeve part 7, as a result of which an injection valve having a small cross section is made possible.

The second bearing surface 10 in the nozzle body 3 is preferably formed at the height at which a pressure chamber 5 is made in the nozzle body 3, so that the line of action of the prestressing force passes through the pressure chamber 5. The pressure chamber 5 is connected to the fuel line, so that fuel at high pressure is present in the pressure chamber 5. The provision of the pressure chamber 5 enables the nozzle body 3 to have a small wall thickness in the region of the pressure chamber 5, so that it is advantageous if a prestressing force is exerted from the outside on the nozzle body 3 in the region of the pressure chamber 5, which force counteracts the pressure in the pressure chamber 5. This prestressing force is exerted on the nozzle body 3 by the transmission element 4. In this manner, an optimum passing of the prestressing force to the wall of the pressure chamber 5 is achieved.

Figure 2:
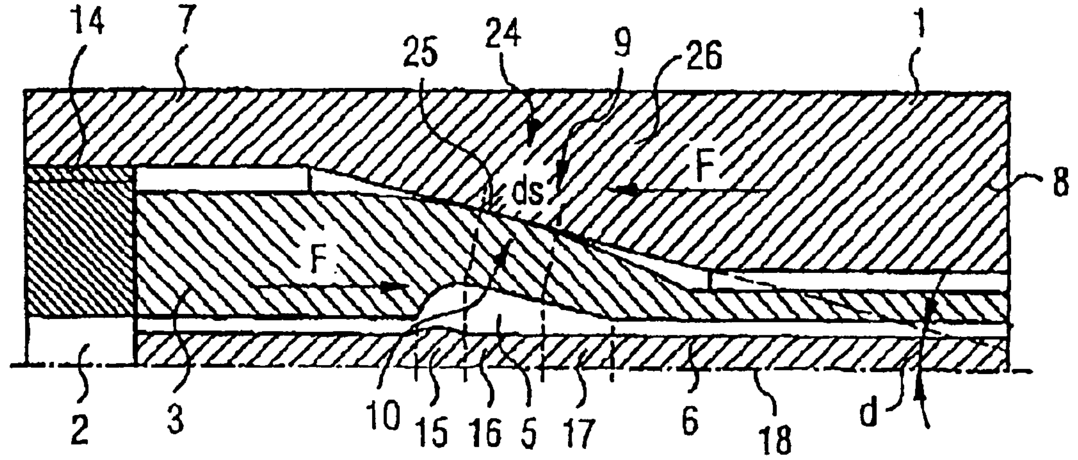
FIG. 2 shows a second embodiment with a curved bearing surface.

FIG. 2 shows a further embodiment which makes possible an improved guidance of the prestressing force from the clamping nut 1 to the nozzle body 3. In this case, the second bearing surface 10 has a convex curvature 24 in cross section. The curvature 24 constitutes a surface which is shaped convexly in cross section. The convex surface proceeds continuously from the surface of the first section 19 and preferably merges at a defined radius into the second section 21 at an angle of greater than 180°. The convex surface is designed rotationally symmetrically with respect to the central axis of symmetry 18. The radius of the convex surface preferably lies in the region of from 20 to 60 mm. The clamping nut 1 is screwed to the housing 2 by the thread 14 and prestresses the nozzle body 3 in the direction of the housing 2. For this purpose, a prestressing force F is transmitted by the clamping nut 1 via the first bearing surface 9 to the second bearing surface 10 of the nozzle body 3.

In this exemplary embodiment, the first bearing surface 9 is designed as a conical inner surface which tapers in the direction of the second section 21 of the nozzle body 3. The first bearing surface 9 is preferably arranged at a fourth angle d with respect to the central axis of symmetry 18. The fourth angle d lies in the range of from 10° to 70°, preferably in the range of from 40° to 60°.

The second bearing surface 10 is assigned to the first bearing surface 9 and bears directly against the first bearing surface 9 in a supporting region 25. The bearing region 25 extends over a certain length in the longitudinal direction of the nozzle body 3, so that a defined pressing of the ring surface between the clamping nut 1 and the nozzle body 3 is achieved. This surface pressure is achieved on account of the curved shape of the second bearing surface 10. The convex shape of the second bearing surface 10 means that it is not necessary to produce the first and the second bearing surface 9, 10 with a precisely set differential angle. Relatively large angular ranges are sufficient for optimum surface pressing. This permits a simple and cost-effective manufacturing of the injection valve.

In FIG. 2, the convex surface 24 is formed on the second bearing surface 10. However, in further embodiments the convex surface 24 may also be arranged on the first bearing surface 9 of the clamping nut 1 and the second bearing surface 10 may be designed in the form of a conical surface which tapers in the direction of the second section 21 of the nozzle body 3. In a further embodiment, the convex surface 24 of the nozzle body 3 is assigned a concave surface which is formed on the clamping nut 1. This embodiment provides a very good surface contact. In addition, use can be made of smaller radii which can be more easily checked during the manufacturing.

The nozzle body 3 is designed corresponding to the nozzle body 3 from FIG. 1 except for the shape of the second bearing surface 10 and the shape of the clamping nut 1. Identical parts are provided with the same reference numbers.

The clamping nut 1 merges from a ring part 8 into a sleeve part 7 in a transitional region 26. The transitional region is designed in the form of an inner conical surface 9, so that the wall of the clamping nut 1 on the ring part 8 continuously decreases in size as far as the sleeve part 7. Since the clamping nut 1 is essentially in the form of a sleeve, the diameter of the inner recess of the clamping nut 1 has a smaller value in the region of the ring part 8 than the diameter of the inner recess of the clamping nut 1 in the region of the sleeve part 7. The nozzle body 3 and the housing 2 are placed into the inner recess of the clamping nut 1. It is essential that there is at least one curved bearing surface in a surface pairing between the clamping nut 1 and the nozzle body 3, so that a relatively wide ring surface is achieved as bearing region 25, with which the first and second bearing surfaces 9, 10 bear against each other and the prestressing force is transmitted. By means of the wide ring surfaces, the press-on force is provided over a relatively small surface pressure, so that both the clamping nut 1 and the nozzle body 3 are subject to relatively small stresses. This permits a thinner design of the wall of the clamping nut 1 and also a thinner design of the wall of the nozzle body 3.

FIG. 2 shows an optimized position of the contact region between the first bearing surface 9 and the second bearing surface 10, which is arranged in a second region 16 of the pressure chamber 5. The second region 16 is arranged in the central third of the pressure chamber 5. In this manner, an optimum support of the wall of the nozzle body 3 is achieved in the region of the pressure chamber 5, as a result of which a thin design of the wall of the nozzle body 3 is made possible. As a result, an injection valve is possible which has a small diameter in the region of the pressure chamber 5. The direction of the transmitted prestressing force, which emerges from the bearing region 25 and acts on the pressure chamber 5 in the second region 16, is indicated by dashed lines.

Figure 3:
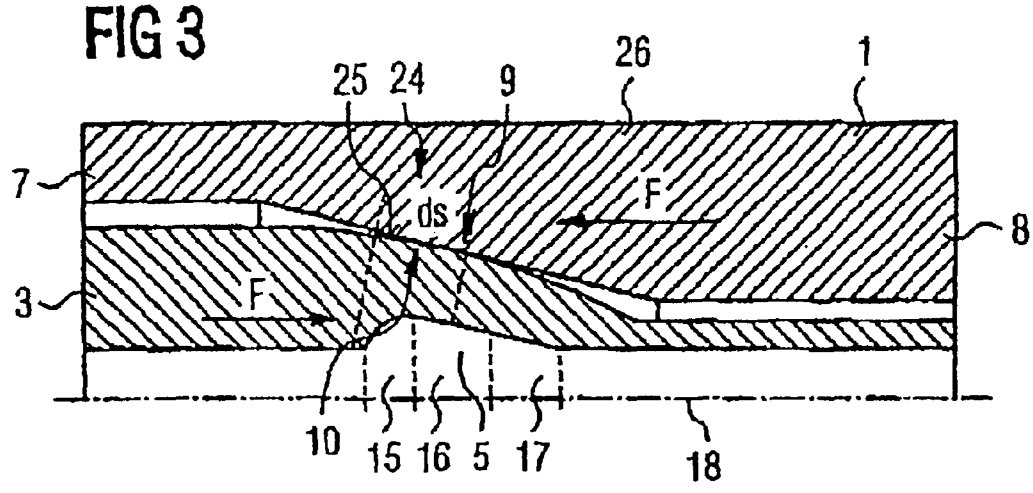
FIG. 3 shows the curved bearing surface in the upper region of the pressure chamber.

FIG. 3 shows an embodiment of the injection valve according to FIG. 2, but with the bearing region 25 between the first and the second bearing surfaces 9, 10 being arranged in an upper, first third, a first region 15, of the pressure chamber 5.

Figure 4:
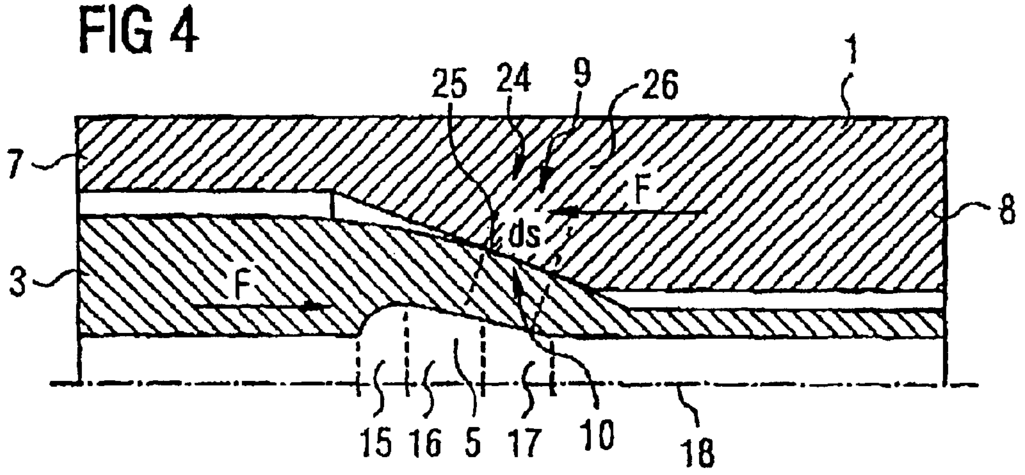
FIG. 4 shows the curved bearing surface in the lower region of the pressure chamber.

FIG. 4 shows a further embodiment of the injection valve according to FIG. 2, the bearing region 25 being arranged in a third region 17, in the lower third of the pressure chamber 5. The embodiments of FIGS. 3 and 4 permit good support of the pressure chamber 5, optimum values, however, being achieved with the embodiment of FIG. 2.

An essential advantage of the embodiments of FIGS. 2 to 4 is that at least one bearing surface has a convex surface 24 in the direction of the other bearing surface. This ensures an enlarged pressing of the ring surface between the first and the second bearing surfaces. This makes it possible to use relatively large angular ranges in the manufacturing of the first and the second bearing surfaces, so that the manufacturing is less complex. In addition, a small surface pressure is achieved, so that both the nozzle body and the clamping nut are subject to smaller stresses. In addition, by means of the large bearing region 25 in the region of the pressure chamber 5, a counterpressure is applied to the wall of the nozzle body 3 in the region of the pressure chamber 5, so that the wall of the nozzle body 3 can be of relatively thin design in the region of the pressure chamber 5 and, nevertheless, a high fuel pressure can be applied in the pressure chamber 5 without the nozzle body 3 being damaged by the high fuel pressure. This in turn makes possible an injection valve having a small cross section.

Figure 5:
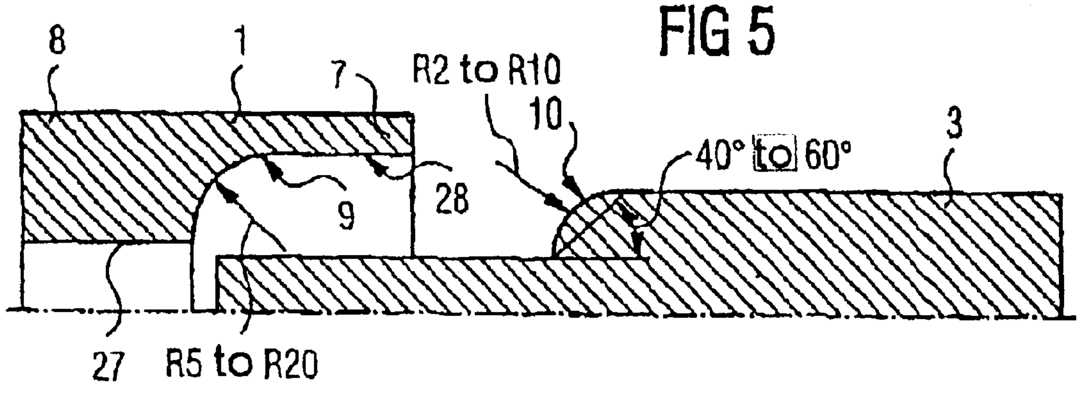
FIG. 5 shows an embodiment with a partially spherical surface and a convex surface.

FIG. 5 shows a further embodiment in which the second bearing surface 10 on the nozzle body 3 is designed as a convex surface. The convex surface preferably has radii in the range of from 2 to 10 mm. The second bearing surface 10 is designed rotationally symmetrically with respect to the central axis of symmetry 18. In the illustration of FIG. 5, details, such as the pressure chamber 5 and the recess 23, are not illustrated explicitly. The clamping nut 1 has a first bearing surface 9 which is designed as a partially spherical surface. The partially spherical surface has a concave shape which has a radius in the range of from 5 to 20 mm. The first bearing surface 9 proceeds continuously in cross section from the inner wall 28 of the sleeve part 7 and intersects the inner surface 27 on the ring part 8 preferably at an angle of larger than 90°. The radii of the first and second bearing surfaces 9, 10 are matched to each other in such a manner that as large a surface contact as possible between the first and the second bearing surfaces 9, 10 is achieved.

The dome-like shape of the first bearing surface 9 and of the convex surface of the second bearing surface 10 enable optimum matching which permits the use of relatively small radii for the first and the second bearing surfaces 9, 10. The relatively small radii have the advantage that small radii can be checked precisely and re-measured. In this manner, a precise keeping to the predetermined radii is made possible during the production.

An essential advantage of the concave partially spherical surface is that the partially spherical surface and the assigned convex surface are simple to manufacture.

What is claimed is:

1. An injection valve comprising a housing, a nozzle body, and a clamping nut, said nut connected to said housing and resting with a first bearing surface on a second bearing surface of the nozzle body, and said nut clamping the nozzle body against the housing, wherein one of said bearing surfaces has a curvature in the direction of the other bearing surface, and said bearing surfaces bear against each other in the region of the curvature, wherein the nozzle body includes a pressure chamber arranged completely within the region of curvature in the axial direction.

2. An injection valve according to claim 1, wherein the second or the first bearing surface has a conical surface.

3. An injection valve according to claim 1, wherein the surface curvature comprises a convex surface.

4. An injection valve according to claim 1, further comprising a bearing region wherein the curvature bears against a bearing surface arranged at a height position corresponding to the center of the pressure chamber.

5. An injection valve comprising:

a housing, a nozzle body;

a clamping nut connected to the housing and resting with a first bearing surface on a second bearing surface of the nozzle body, the clamping nut operable to clamp the nozzle body against the housing, the first or the second bearing surface has a curvature in the direction of the second or first bearing surface, and in that the first and the second bearing surfaces bear against each other in the region of the curvature with a prestressing force, wherein the nozzle body includes a pressure chamber arranged completely within the region of curvature in the axial direction such that the prestressing force passes through the pressure chamber.

6. An injection valve according to claim 5, wherein the conical surface has, in cross section, an angle between 40° and 60° with respect to the central axis of the injection valve.

7. An injection valve according to claim 5, wherein the second or the first bearing surface has a conical surface.

8. An injection valve according to claim 5, wherein the surface curvature comprises a convex surface.

9. An injection valve according to claim 5, further comprising a bearing region wherein the curvature bears against a bearing surface arranged at a height position corresponding to the center of the pressure chamber.

10. An injection value according to claim 5, wherein the curvature has a radius in the range of from 20 to 60 mm in the plane of the central axis of the injection value.

11. An injection value according to claim 5, wherein the curvature has a radius in the range of from 2 to 20 mm in the plan of the central axis of the injection value.

* * * * *